May 14, 1935.   A. S. FENTON   2,001,570

LINE DRIER

Filed March 30, 1934

INVENTOR
Albert S. Fenton,
BY
Beau Brooks.
ATTORNEYS

Patented May 14, 1935

2,001,570

UNITED STATES PATENT OFFICE 2,001,570

LINE DRIER

Albert S. Fenton, Buffalo, N. Y.

Application March 30, 1934, Serial No. 718,285

3 Claims. (Cl. 242—104)

The present invention relates to a device for drying line and more particularly to a device adapted to be used in conjunction with a rod butt carrying a reel wound with line such as fishing line used in salt water fishing.

The instant device affords a line drier that can be used in conjunction with a rod butt having a reel attached wherein it is unnecessary to remove the reel from the rod butt; a line drier that is adapted to fit into the rod butt and when so fitted will remain upright without the necessity of clamping the device to a table top or other object; the invention further provides a line drier which can be readily disassembled and carried or transported readily since in the disassembled form the device requires but a minimum of space.

Figure 1:
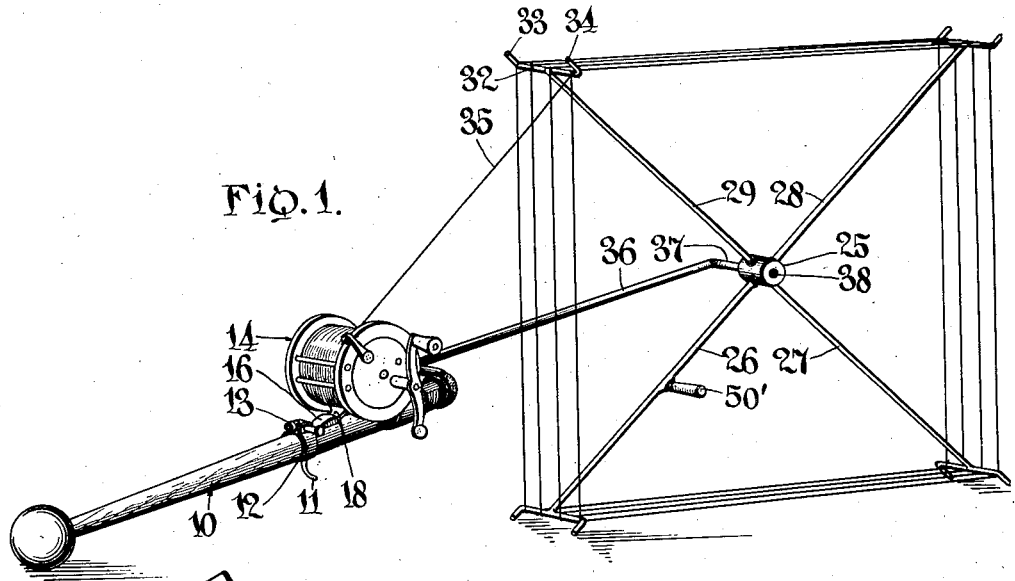
Fig. 1 is a view in perspective of the line drier used in conjunction with a rod butt having a reel attached thereto.

Referring more particularly to the drawing, the butt end of a fishing rod or pole is shown at 10 having a usual finger clamp 11 carried adjacent the forward end of the handle grip upon a split ring 12 clamped to the butt 10 by means of fastening the device 13.

Figure 2:
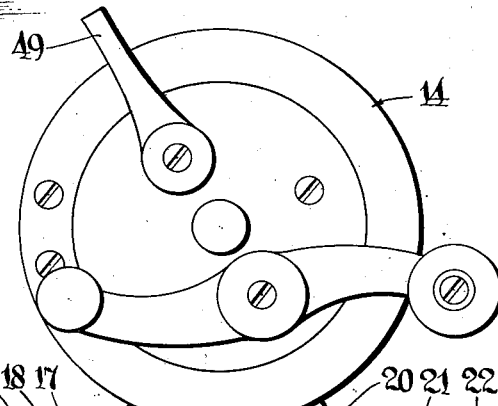
Fig. 2 is a section through the rod butt and attachment of the line carrying device showing a reel in side elevation.

Reel 14 is fastened to rod butt 10 in any convenient fashion and, as is usual in sea water fishing may be taped to the rod butt or may be carried thereon in the usual reel seat provided upon the rod butt. As best shown in Fig. 2, a sleeve 15 encompasses the upper end of the rod butt 10 and carries thereon a portion 16 provided with a recess 17 adapted to receive the reel attaching finger 18 connected to reel 14. The forward end of sleeve 15 is provided with a threaded portion 19 having a cut-away portion in alignment with recess 17 to receive a companion reel attaching finger 20 which is engaged between the sleeve 15 and the loose ring 21 and the reel held rigidly in position by the engagement of ring nut 22 and the locking ring nut 23. The forward end of the reel butt is provided with a socket 24 adapted to engage extension portions of a jointed rod.

Figure 3:
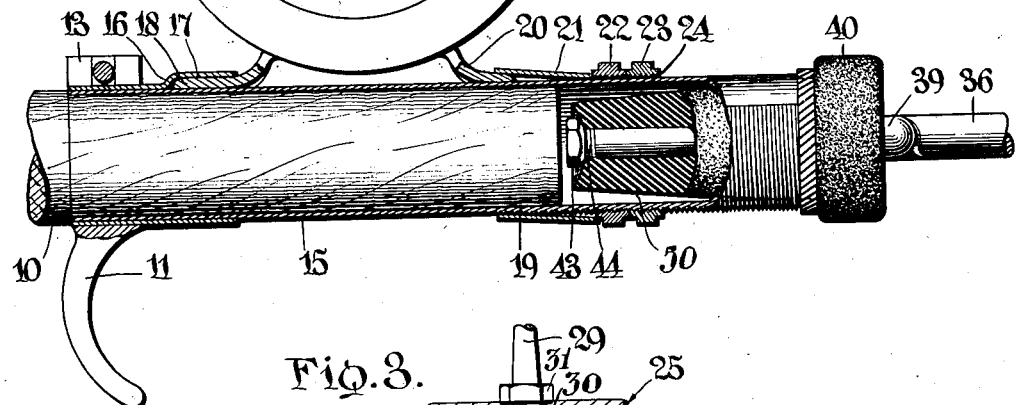
Fig. 3 is a fragmentary view of the hub of the line drying device showing means for preventing over-running of the line.

The line carrying device adapted to be used for drying purposes comprises a hub member 25 having a plurality of detachable arms 26, 27, 28 and 29 removably attached thereto by means of the threaded ends 30 and adjustable nut 31 (Fig. 3). Each arm is provided with a forked end portion presenting a flat line bearing surface 32 normally of a width greater than the width of the reel and having outwardly extending prong members 33 and 34 for retaining a line 35 upon the line bearing portion 32 of the line drying device or drier. The drier is attached to the rod butt 10 in convenient fashion by providing a connecting member 36 provided at one end with an elbow 37 whereby the outwardly extending portion 38 forms a convenient attaching member for hub 25 and about which portion the drying device may be rotated. The length of attaching member 36 is conveniently greater than the length of any line carrying fork so that upon rotating the line drier about axis 38 clearance is had between the fork prongs 33, 34, extension rod 36 and rod attaching portion 39 extending substantially parallel to portion 38 and thence bent to parallel the main portion 36.

Complete assembly of rod butt 10 and the line drying and carrying device comprising the hub 25 and the plurality of carriers 26, 27, 28 and 29 is made by means of the flexible tapered attaching member 40 carried by end portion 39 of extension member 36 and attached thereto by means of nut 43 upon threaded end 44 of member 39. The resilient seating member 40 is formed with tapered sides 50 so that the member may be inserted in socket 24 and be readily adaptable to fit in sockets of rod butts currently manufactured and used.

When a reel is securely attached to a rod butt by taping or otherwise a convenient line drier is produced by inserting resilient member 40 in the socket 24 and winding the wet line upon the forked line holders 26, 27, 28 and 29 by use of the hand grip member 50' and permitting the united rod butt and drier to stand until the line is sufficiently dry to be re-wound upon reel 14. In order to prevent over-running of line 35, hub 25 is formed with a recessed portion 45 for receiving a coil spring 46 bearing against a member 47 causing hub 25 to bear frictionally against friction washer 48 so that when winding dried line upon the reel any desired friction may be obtained on the drier by adjusting adjustable screw 51 while in winding the line upon the drier from the reel friction action is induced in the reel by turning friction engaging member 49 to the operative position.

What is claimed is:

1. A line drier for engagement with a rod butt having a socket in one end thereof comprising a rotatable hub, a plurality of arms connected to said hub for engaging a line, means extending through said hub for rotation of the hub thereon at one end and for the major length thereof being parallel to the plane of rotation of said hub, and a tapered resilient member carried on the other end for engagement with a rod butt socket.

2. A line drier for engagement with a rod butt having a socket in one end thereof comprising a rotatable hub, a plurality of arms connected to said hub for engaging a line, means for exerting friction on said hub, means for adjusting the friction exerted on said hub, means extending through said hub for rotation of the hub thereon at one end and for the major length thereof being parallel to the plane of rotation of said hub and a tapered resilient member carried on the other end for engagement with a rod butt socket.

3. A line drier for engagement with a rod butt having a socket in one end thereof comprising a rotatable hub, a plurality of arms connected to said hub for engaging a line, supporting means extending through said hub for rotation of the hub thereon at one end and a tapered resilient member carried on the other end of said means for engagement with a rod butt socket.

ALBERT S. FENTON.